United States Patent
Kenchappa et al.

(10) Patent No.: US 12,015,535 B2
(45) Date of Patent: Jun. 18, 2024

(54) CONDUCTING NETWORK PERFORMANCE ANALYSIS

(71) Applicant: HEWLETT PACKARD ENTERPRISE DEVELOPMENT LP, Houston, TX (US)

(72) Inventors: Shithal Tumkur Kenchappa, Karnataka (IN); Prashanth Tamraparni, Karnataka (IN); Duncan Roweth, Bristol (GB); David Charles Hewson, Bristol (GB); Vivek Sharma, Indore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/976,553

(22) Filed: Oct. 28, 2022

(65) Prior Publication Data

US 2024/0146631 A1    May 2, 2024

(51) Int. Cl.
*H04L 43/0852* (2022.01)
*H04L 41/0604* (2022.01)
*H04L 43/067* (2022.01)

(52) U.S. Cl.
CPC ...... *H04L 43/0852* (2013.01); *H04L 41/0627* (2013.01); *H04L 43/067* (2013.01)

(58) Field of Classification Search
None
See application file for complete search history.

(56) References Cited

U.S. PATENT DOCUMENTS 10,372,647 B2   8/2019   Lovett et al.
11,128,531 B2   9/2021   Milojicic et al.
(Continued)

OTHER PUBLICATIONS

Author: Carmen Sigovan et al. Title: "A Visual Network Analysis Method for Large-Scale Parallel I/O Systems" Publisher: IEEE DOI: 10.1109/IPDPS.2013.96 (Year: 2013).*

(Continued)

*Primary Examiner* — John A Follansbee
*Assistant Examiner* — Kamal M Hossain
(74) *Attorney, Agent, or Firm* — Yao Legal Services, Inc.

(57) ABSTRACT

A method for conducting a network performance analysis, the method comprising measuring latencies of a plurality of packets communicated over a network includes determining latency representations for a plurality of levels of the network, for a plurality of communication routes, and/or for a plurality of communication types. The latency representations comprise the latency measurements, statistical representations of the latency measurements, and/or latency metrics derived from the latency measurements. The method includes comparing the determined latency representations to expected latency representations, the expected latency representations comprising expected latencies, expected statistical representation of latencies, and/or expected latency metrics. Based on the comparison, the method includes determining a discrepancy between one of the expected latency representations and one of the determined latency representations; and based on the determined discrepancy, identifying one of the levels of the network, the communication routes, and/or the communication types as an excess-latency-causing portion of the network.

15 Claims, 7 Drawing Sheets

(56) References Cited

U.S. PATENT DOCUMENTS

| | | | |
|---|---|---|---|
| 11,386,049 B1 | 7/2022 | Glass et al. | |
| 2019/0052565 A1* | 2/2019 | Modi | H04L 47/283 |
| 2019/0280983 A1* | 9/2019 | Thubert | H04L 47/283 |
| 2020/0145310 A1 | 5/2020 | Lodhia et al. | |
| 2021/0351997 A1* | 11/2021 | Luft | H04L 43/16 |
| 2023/0076842 A1* | 3/2023 | Panesar | H04L 45/24 |

OTHER PUBLICATIONS

HPE, "HPE Cray Programming Environment", 2022, 10 pagess.
HPE, "HPE Slingshot Interconnect—Your HPC Networking Solution", available online at <https://www.hpe.com/us/en/compute/hpc/slingshot-interconnect.html>, 2022, 10 pages.
HPE, "HPE Slingshot", May 16, 2022, 13 pages.
MVAPICH, "MVAPICH: MPI over InfiniBand, Omni-Path, Ethernet/iWARP, RoCE, and Slingshot", NBCL, 2022, 3 Pages.
OpenFabrics Interfaces, "Libfabric OpenFabrics", available online at <https://ofiwg.github.io/libfabric/>, 2022, 3 pages.
PE-Cray, "Cray OpenSHMEMX", available online at <https://pe-cray.github.io/cray-openshmemx/>, Oct. 11, 2022, 1 pages.
Sensi et al., "An In-Depth Analysis of the Slingshot Interconnect", Aug. 20, 2020, 13 pages.
SST, "The Structural Simulation Toolkit", available online at <http://sst-simulator.org/>, 2022, 3 pages.
Wybron, "CXI User Manual", Apr. 14, 2003, 22 pages.

\* cited by examiner

CONDUCTING NETWORK PERFORMANCE ANALYSIS

BACKGROUND

With the recent proliferation of high-performance computing (HPC) systems (e.g., Exascale computing systems), it has become more important than ever to extract every bit of performance from each component of the system (e.g., compute, memory, network, and storage) to ensure, for instance, that real-world problems can be effectively solved. Maximizing system performance and co-designing software to extract every bit of performance from all the system components can be essential to delivering adequate functioning of HPC systems. It is also critical that performance commitments of HPC applications be met, an important part of delivering Exascale systems and getting them accepted. Developing a detailed understanding of the performance that is achieved by each component of an HPC system is a first step in maximizing system performance.

BRIEF DESCRIPTION OF THE DRAWINGS

Various examples will be described below with reference to the following figures.

Throughout the drawings, identical reference numbers designate similar, but not necessarily identical, elements. Moreover, the drawings provide examples and/or implementations consistent with the description; however, the description is not limited to the examples and/or implementations provided in the drawings.

DETAILED DESCRIPTION

A multi-node computing system, such as a high-performance computing (HPC) system, comprises multiple computing nodes interconnected by a network. In such systems, the overall performance of the system as a whole depends, in part, on the performance of the network that interconnects the nodes. Moreover, as the computing nodes in such systems become faster with each generation and the amount of data shared by the nodes increases, it is even more important that the network interconnecting the nodes is highly performant to allow maximum system performance and to avoid the network becoming a bottleneck in the system. However, a high-performance network of such an HPC system may be made up of many different elements, both hardware and software, which may interact in a variety of ways. For example, each of the nodes in the system may comprise a network interface element (e.g., a network interface card (NIC)), applications that communicate over the network, and an interface library layer that facilitates communication of the applications over the network. These may be referred to as different "levels" of the network (e.g., application level, library level, and hardware level). In addition, the network may comprise various networking devices external to the nodes (e.g., switches) connecting the nodes in a variety of topologies. For example, in some HPC systems the nodes may be arranged in multiple groups (e.g., 32 nodes per group, in some example systems) with each group comprising multiple switches (e.g., four switches, in some example systems) to interconnect the nodes of the group. The switches of one group may also be connected to the switches of the other groups to interconnect the groups. These external networking devices are also part of the aforementioned hardware level of the network. Thus, with all of these elements taking part in communication over the network at various different levels thereof, it can be difficult to fully understand how each contributes to the overall performance of the network. In particular, it can be difficult for the system or for a system administrator or user to identify where in the network problems may exist. For example, if the overall performance of the system as a whole is less than desired, it can be difficult to know whether that is because of an issue in the network, and if so, whether something is wrong at the application level, the library level, or the hardware level.

Thus, the present disclosure provides for performing an end-to-end network performance analysis that may allow problem areas of the network to be identified by breaking down performance latency measurements based on different hardware and software components and comparing (e.g., by a processor) the latency measurements, statistical representations of the latency measurements, and/or metrics derived from the latency measurements or the statistical representations to expected latencies/statistical representations/metrics. Based on the comparison, it may be determined where (e.g., at which level or levels of a network, for which communications routes, and/or for which communication types) higher than expected latencies are occurring. In some implementations, latency measurements may be determined at a number of different network levels (e.g., an application level, a library application level, and a hardware level), for a number of different types of communication routes, and/or for a number of different types of communications. Examples of these different communication routes, for use, for instance, in dragonfly networks, include routes between two nodes in a same group and connected to a same switch (SGSS), routes between two nodes in a same group and connected to different switches (SGDS), and routes between two nodes in different groups and connected to different switches (DGDS), or other types of routes within the network. Examples of the different types of communications include a GET/read communication, a PUT/write communication, or other types of communications. The latency measurements, statistical representations thereof (e.g., an average, a mode, a median, a histogram, etc.), and/or metrics derived therefrom may be compared to expected values. These expected values may be predetermined, configurable, and/or dynamically determined (e.g., based on the measured latencies or metrics derived therefrom).

Based on the comparisons, a discrepancy between the expected value and the measured latency (or statistical representation or derived metric) may be determined for at least one of the network levels, communication routes, and/or communication types. Discrepancies may be determined, by way of example, when a difference between two latency measurements/statistical representations/metrics that are compared with one another exceeds a threshold value or a given percentage, when the latency measurements/statistical representations/metrics are more than a certain number of standard deviations apart, or when there is any other predetermined or dynamically determined discrepancy therebetween. In response to determining a discrepancy at a network level, communication route, and/or communication type, that network level, route, and/or communication type may be identified (e.g., by a processor) as potentially having a problem that is causing the excess latency, and thus further troubleshooting may be focused on that potentially problematic portion of the system. Thus, the examples disclosed herein may allow for improved performance in computing systems, such as HPC systems, by facilitating the identification (and subsequent correction) of network problems that may be impairing the system's performance. Such identification and correction may be performed by a processor of the system and/or may be output for analysis by a user.

For example, in one mode of analysis, an average latency may be determined for a plurality of combinations of network levels, communications routes, and communication types. Intermediate metrics then may be determined from these average latencies. For example, an average latency value at one network level, communication route, and communication type may be subtracted from another average latency value of the same network level and communication type but a different communication route and the resulting value may be a metric identifying a difference in latency that is attributable to the difference in communication route. This same type of metric may be determined for multiple different communication types at the same network level and the metrics may be compared to one another, with one of the derived metric values being used as the "expected" value in relation to the other derived metric and any discrepancies therebetween can be identified. Other metrics may be derived from the measured latencies (in addition to or in lieu of the forgoing example), and the metrics may be compared to one another with some being used as the expected value in comparison to other values.

As another example, in a second mode of analysis, a statistical distribution of the latency measurements for a given network layer, communication route, and/or communication type may be determined, and this statistical distribution may be compared to an expected distribution to identify discrepancies. For example, in some implementations, the statistical distribution comprises a histogram formed from the determined latency measurements for a given network layer and communication type being grouped into a plurality of bins. The histogram of determined latency measurements may be compared to an expected histogram. Based on the comparison, a discrepancy between the expected distribution and the determined distribution may be determined. For example, the number and/or locations of peaks in the distribution may be compared to an expected number and/or expected locations of peaks in the expected distribution, and any discrepancies may be identified. Based on where the discrepancy is located (e.g., which network level, communication route, and/or communication type the discrepant distribution corresponds to), one of the network levels, communication routes, and/or communication types may be identified as problematic (i.e., an excess-latency-causing portion of the network).

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Figure 1A:
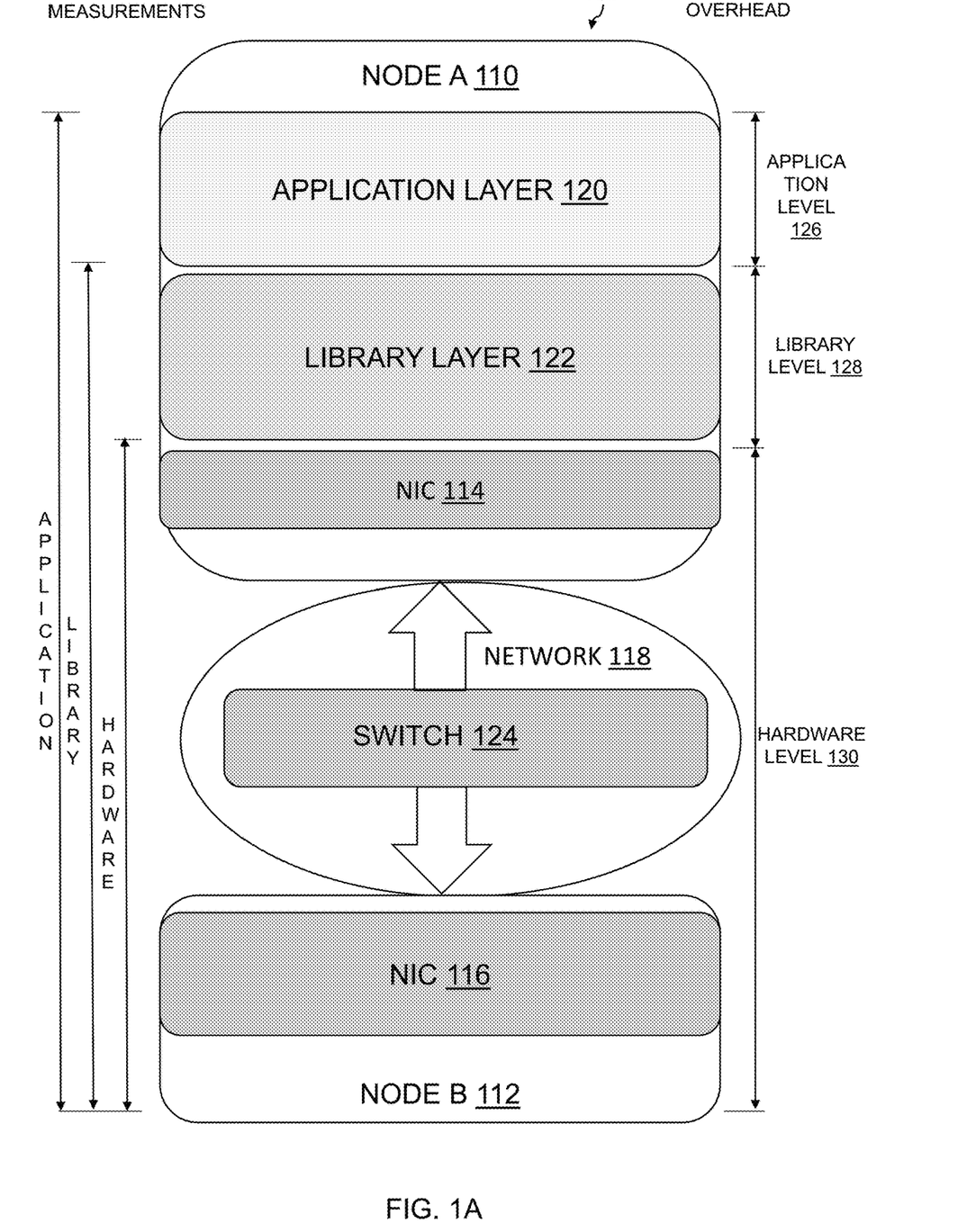
FIG. 1A is a block diagram of an example computing system in accordance with some implementations of the present disclosure.
Figure 1B:
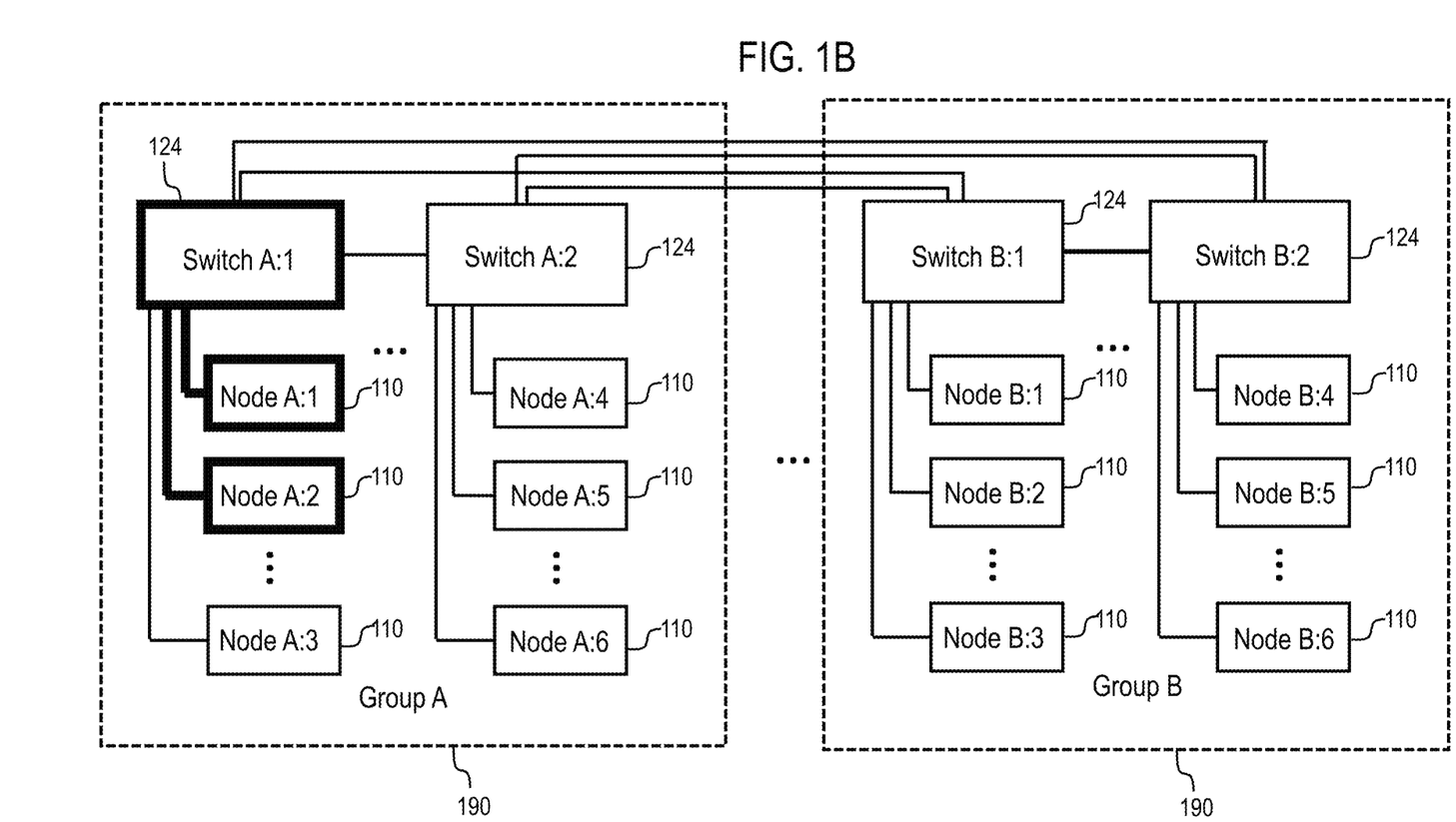
FIG. 1B is a block diagram of an example computing system in accordance with some implementations of the present disclosure, showing a first example communication.
Figure 1C:
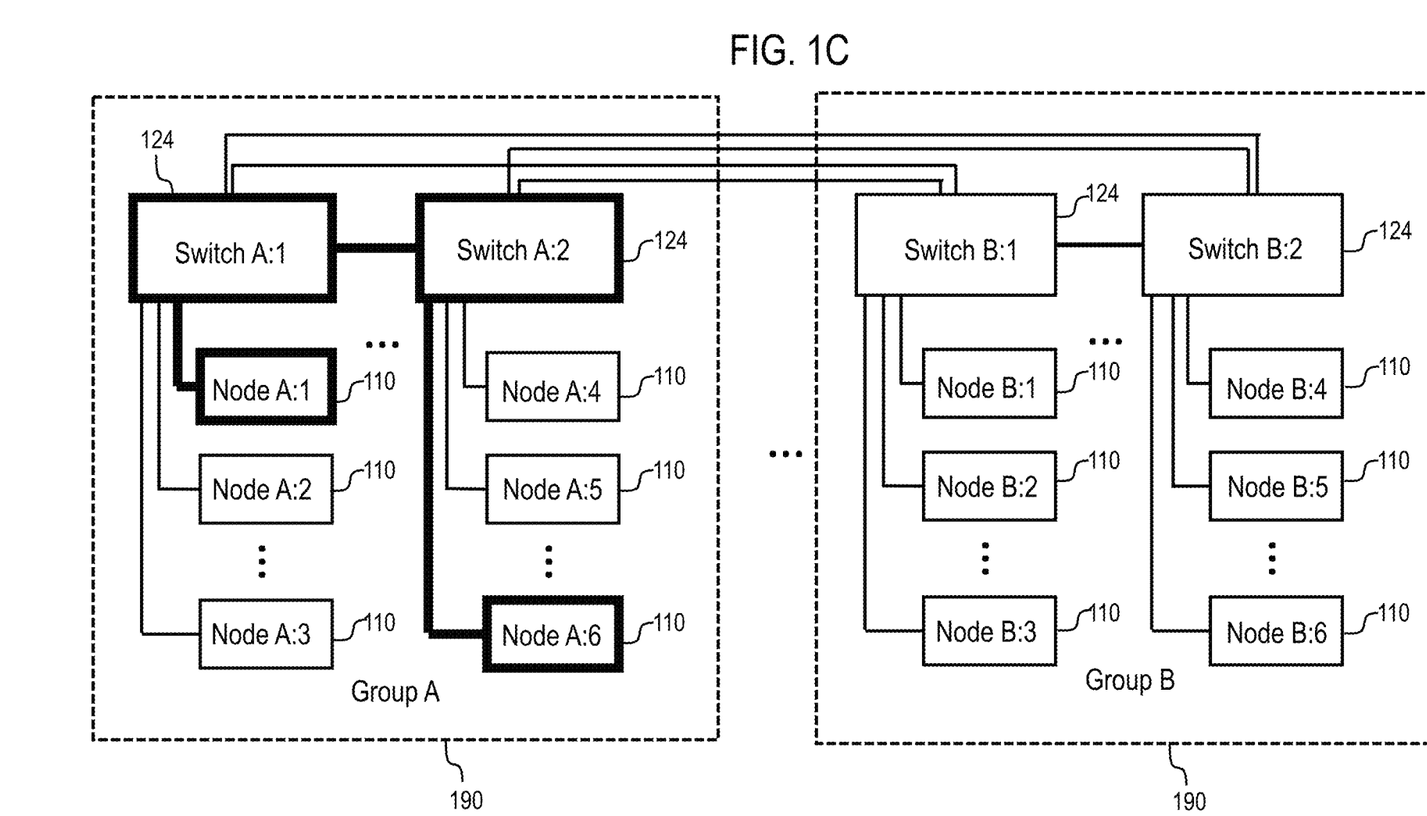
FIG. 1C is a block diagram of an example computing system in accordance with some implementations of the present disclosure, showing a second example communication.
Figure 1D:
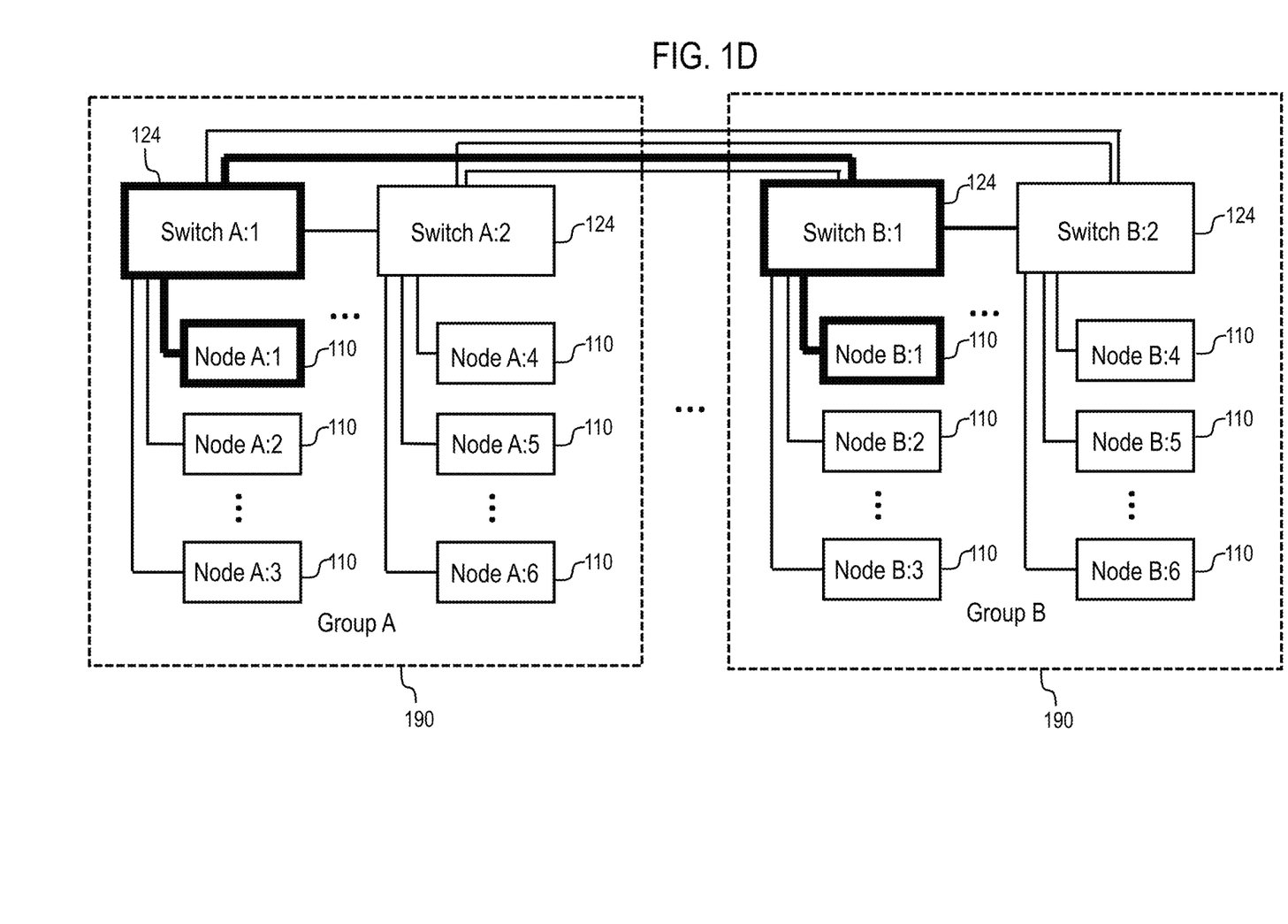
FIG. 1D is a block diagram of an example computing system in accordance with some implementations of the present disclosure, showing a third example communication.

FIGS. 1A-1D are block diagrams of a computing system 100 configured for conducting an end-to-end network performance analysis, in accordance with some implementations of the present disclosure. The computing system 100 includes multiple nodes 110. In FIG. 1, two nodes, node A 110 and node B 110, are illustrated. In FIGS. 1B-1D twelve nodes 110 are illustrated. It will be understood by those having ordinary skill in the art that the number of nodes shown in FIGS. 1A-1D are not intended to be limiting and that computing systems having any number of nodes are contemplated to be within the scope of implementations of the present disclosure. By way of example, and not limitation, each of the nodes 110 may comprise computing devices. As shown in FIG. 1A, each node 110 includes a network interface element (e.g., a Network Interface Card (NIC)) 114, 116, respectively, configured to connect the respective node 110 to the network 118. Node A 110 further is illustrated to include an application layer 120 configured to contain applications that communicate over the network 118, and a library layer 122 configured to facilitate communication of the applications over the network 118. (It will be understood that although not illustrated with respect to node B 110, node B also may contain an application layer and a library layer within the scope of implementations of the present disclosure.)

Computing system 100 also includes at least one switch 124 (in most systems, multiple switches 124) configured to connect node A 110 and node B 110. The network 118 comprises the switch(es) 124 as well as the cables or other interconnects that extend between the nodes and the switches 124. The network 118 may also be considered as including the application layer 120, library layer 122, and NICs 114 and 116 for purposes of analyzing network performance, as these layers all participate in the delivery of packets through the network 118 and may have an effect on the performance of the network 118. For example, in one implementation the system 100 is an HPC system (such as, for example, an HPE Cray EX system, an HPE Cray supercomputer, or an HPC cluster), the switch 124 comprises an HPC switch (such as, for example, an HPE Slingshot switch), the NIC 114 comprise an HPC NIC configured for use with the switch 124 (such as, for example, a Cassini NIC), the library layer 122 comprises an interface configured for use with the NIC 114 (such as, for example, a Cassini eXascale Interface (CXI)), and the application layer 120 comprises one or more HPC applications (such as, for example, a Symmetric Hierarchical MEMory (SHMEM) application).

In some examples, the nodes may be arranged in multiple groups 190, with each group 190 comprising multiple switches 124, as shown in FIGS. 1B-1D. For example, in one implementation there are 32 nodes 110 and four switches 124 per group 190. Any number of groups 190 may be provided in the system 100, any number of switches 124 may be provided per group 190, and any number of nodes 110 can be provide per switch 124 (subject only to the capabilities of the hardware involved and the desired topology and performance of the system 100).

Each node 110 is connected to at least one of the switches 124 of its group 190, and the switches 124 of one group 190 are connected to the switches 124 of another group 190. Thus, if the node A 110 and the node B 110 are part of the same group and connected to the same switch 124, then their communications with one another may be classified herein as SGSS. For example, FIG. 1B illustrates one such SGSS communication between node A:1 100 and node A:2 100, which are both connected to the same switch A:1 124 of the same group A 190. Such communications do not require any switch hops (i.e., transfers from one switch 124 to another switch 124), and thus may be expected to have a relatively lower latency.

If the node A 110 and the node B 110 are part of the same group and connected to different switches 124 of that group, then their communications with one another may be classified herein as SGDS. For example, FIG. 1C illustrates one such SGDS communication between node A:1 100 and node A:6 100, which are connected to the switches A:1 124 and A:2 124, respectively, of the same group A 190. Such communications require one local switch hop (i.e., transfers from one switch 124 to another switch 124 in the same group), and thus may be expected to have a slightly higher latency.

If the node A 110 and the node B 110 are part of different groups and connected to different switches 124 of their respective groups, then their communications with one another may be classified herein as DGDS. For example, FIG. 1D illustrates one such DGDS communication between node A:1 100 and node A:6 100, which are connected to the switches A:1 124 and B:1 124, respectively, of the groups A 190 and B 190, respectively. Such communications require at least one global switch hop (i.e., transfers from one switch 124 to another switch 124 in a different group 190), and thus may be expected to have the highest latency of the three routes described above. In particular, in some implementations, the various groups 190 may correspond to locations that are physically (and in some cases, logically) separate, such as different chassis, different racks, and/or rows of racks, or even different geographical locations (e.g., different datacenters) in some cases. As a result, the global switch hop may be expected to have a slightly higher latency then the intra-group switch hop in some implementations.

The present disclosure provides a framework configured to measure performance by way of packet latencies at different levels of the network so that the contribution of each network level to the overall achieved latency can be examined. As such, in the computing system 100 of FIGS. 1A-1D, the application layer 120 of node A 110 represents the application level 126 of the network 118, the library layer 122 of node A 110 represents the library level 128 of the network 118, and the combination of the NIC 114 of node A 110, the switch 124, and the NIC 116 of node B 110 represents the hardware level 130 of the network 118. Each level 126, 128, and 130 of the network 118 may include one or more tools or utilities associated therewith for measuring latency at that level. For example, the application level 126 may have a tool to measure latency. Examples of such tools are microbenchmarks. The library level 128 may have a tool for measuring latency at that level. An example is the Cassini eXascale Interface (CXI) utility for use in the CXI library. The NIC may have hardware counters to measure the precise latency at the hardware level 130. It will be understood that while some tools may measure latencies directly, others may take measurements that require the application of a mathematical function to convert them into a latency measurement. Any and all such measurements and/or conversions, and any combination thereof, are contemplated to be within the scope of implementations of the present disclosure.

In some examples, once the latencies are measured, statistical representations of the latency measurements may be determined, and/or other metrics may be derived from the latency measurements. Statistical representations may include averages, variances, distributions (e.g., histograms), or other ways of statistically aggregating or representing the measured latency values. Metrics derived from the latency measurements may include values derived from the latency measurements that quantitatively represent an aspect of system performance. For example, one metric may represent the contribution of the application layer to the overall latency and may be derived from the measured latencies by subtracting the latency measured at the library layer from the latency measured at the application layer. A similar metric could be derived to represent the contribution of the library layer to overall latency by subtracting the measured hardware level latency from the measured library level latency. These are merely two examples of metrics, and any number of other metrics may be derived from the measured values, for example by adding or subtracting or otherwise mathematically manipulating the measured values.

Once the latency measurements are obtained and/or derived from the tools at the various network levels 126, 128, and 130, the measurements, statistical representations of the measurements, and/or metrics derived from the measurements or the statistical representations may be compared (e.g., by a processor of the computing system 100) to expected latency measurements/statistical representations/metrics. By way of example and not limitation, expected latency measurements/statistical representations/metrics may include predetermined threshold values, ranges, or representations stored in a memory of the computing system 100, and may be based on specifications associated with the appropriate network level. In some examples, in addition to or in lieu of predetermined expected values, the expected values may be determined dynamically, for example by deriving the expected values from the measurements themselves—for example some measured values or metrics derived therefrom may be used as the expected values for comparison to other measured values or metrics, as is discussed in greater detail below. Based on the comparison of the latency measurements/statistical representations/metrics with the expected latency measurements/representations/metrics, it may be determined (e.g., by a processor of the computing system 100) where (e.g., at which level or levels of a network, for which communications routes, and/or for which communication types) higher than expected latencies are occurring.

In one example, an average latency (i.e., an average latency for a plurality of packets being routed through a particular network level over a given time interval or for a given number of packets) may be determined for a plurality of combinations of network levels, communications routes, and communication types. Table 1 illustrates examples of such average latencies in the rows titled "Software Latency", "Library Latency", and "Hardware Latency".

TABLE 1

| Latency Measurement | GET/read (µs) | | PUT/write (µs) | |
|---|---|---|---|---|
| | SGSS | SGDS | SGSS | SGDS |
| Software Latency | 2.79 | 3.46 | 2.53 | 3.73 |
| Library Latency | 2.62 | 3.33 | 2.02 | 2.63 |
| Hardware Latency | 1.6 | 2.25 | 1.18 | 1.78 |
| Change in Software Latency w/r/t SGSS | | 0.67 | | 1.2 |
| Change in Library Latency w/r/t SGSS | | 0.71 | | 0.61 |
| Change in Hardware Latency w/r/t SGSS | | 0.65 | | 0.6 |
| Software Overhead | 0.17 | 0.13 | 0.51 | 1.1 |
| Library Overhead | 1.02 | 1.08 | 0.84 | 0.85 |

In the illustrated example, looking at the Software Latency row we find that the average latency at the application level for an SGSS communication route for a GET/read communication is 2.79 µs, the average latency for the application level for an SGDS communication route for a GET/read communication is 3.46 µs, the average latency for the application level for an SGSS communication for a PUT/write communication is 2.53 µs, and the average latency for the application level for an SGDS communication route for a PUT/write communication is 3.73 µs. Looking now at the Library Latency row we find that the average latency for the library level for an SGSS communication route for a GET/read communication is 2.62 µs, the average latency for the library level for an SGDS communication route for a GET/read communication is 3.33 µs, the average latency for the library level for an SGSS communication route for a PUT/write communication is 2.02 µs, and the average latency for the library level for an SGDS communication route for a PUT/write communication is 2.63 µs. And, finally, looking at the Hardware Latency row we find that the average latency for the hardware level for an SGSS communication route for a GET/read communication is 1.6 µs, the average latency for the hardware level for an SGDS communication route for a GET/read communication is 2.25 µs, the average latency for the hardware level for an SGSS communication route for a PUT/write communication is 1.18 µs, and the average latency for the hardware level for an SGDS communication route for a PUT/write communication is 1.78 µs.

Intermediate metrics then may be determined from these average latencies. Such intermediate metrics are represented in the remaining rows of Table 1. For example, for a given network level and communication type, an average latency value for one communication route may be subtracted from an average latency value for a different communication route. The resulting value may be a metric identifying a difference in latency that is attributable to the difference in communication route. This is illustrated in the shaded rows of Table 1. For example, the row Change in Software Latency w/r/t SGSS indicates that the difference in the application-level latency for a GET/read communication between an SGSS communication route and an SGDS communication route is 0.67 µs (i.e., 3.46 µs-2.79 µs), and that the difference in the application level latency for a PUT/write communication between an SGSS communication route and an SGDS communication route is 1.2 µs (i.e., 3.73 µs-2.53 µs). Furthermore, the row Change in Library Latency w/r/t SGSS indicates that the difference in the library level latency for a GET/read communication between an SGSS communication route and an SGDS communication route is 0.71 µs (i.e., 3.33 µs-2.62 µs), and the difference in the library level latency for a PUT/write communication between an SGSS communication route and an SGDS communication route is 0.61 µs (i.e., 2.63 µs-2.02 µs). Finally, the row Change in Hardware Latency w/r/t SGSS indicates that the difference in the hardware level latency for a GET/read communication between an SGSS communication route and an SGDS communication route is 0.65 µs (i.e., 2.25 µs-1.6 µs), and the difference in the hardware latency level for a PUT/write communication between an SGSS communication route and an SGDS communication route is 0.60 µs (i.e., 1.78 µs-1.18 µs). These metrics may be referred to herein as SGSS-to-SGDS metrics for short, with the relevant level and/or communication type being appended thereto to identify a specific metric, such as a Library SGSS-to-SGDS GET metric.

These derived intermediate metrics may be compared to one another, with one of the derived metric values being used as the "expected" value in relation to the other derived metrics and any discrepancies therebetween can be identified. In some implementations, the derived metric value used as the "expected" value may be the value representing the lowest latency. For example, the SGSS-to-SGDS metrics related to the difference observed between the SGDS and SGSS configurations at different levels of measurement may be compared, and from this, a couple of observations can be made. First, the SGSS-to-SGDS metrics are approximately all the same for the GET/read communications (i.e., there is approximately the same latency difference (~0.65 µs) between the SGSS communication route and the SGDS communication route for GET/read measurements at all three levels). Second, the SGSS-to-SGDS metrics for the PUT/write communications are not all the same: there is an inconsistency between the SGSS-to-SGDS PUT metrics at the application level and the SGSS-to-SGDS metrics at the other two levels (1.2 µs vs. 0.6 µs and 0.61). This indicates that the application level may be an excess-latency-causing portion of the network, and in particular that PUT/write communications may be a possible source of the issue at the application level.

In some examples, the system 100 may determine that a discrepancy exists between two measurements or metrics when they are more than a predetermined distance apart as measured by actual values, percentages, number of standard deviations, or the like. In particular, in some examples, a discrepancy may be defined as any difference of 20% or more between a value and the expected value. In other examples, a discrepancy may be defined as any difference of 40% or more between a value and the expected value. In other examples, a discrepancy may be defined as any difference of 50% or more between a value and the expected value. In other examples, a discrepancy may be defined as any difference exceeding one standard of deviation. In other examples, a discrepancy may be defined as any difference of 0.1 µs or more between a value and the expected value. In other examples, a discrepancy may be defined as any difference of 0.2 µs or more between a value and the expected value. In some examples, the aforementioned definitions of discrepancies may be combined together, such that a discrepancy is found if any one of a set of definitions is satisfied.

More specifically, in the example above the SGSS-to-SGDS PUT metrics for the library and/or hardware levels are used as the "expected" value in comparison to the SGSS-to-SGDS PUT metric for the application level, and when compared a discrepancy is identified. Because this discrepancy occurs at the application level, this suggests that there may be an issue at the application level. To put this another way, changing from SGSS to SGDS is expected to add some latency since there is another switch hop added. This change is expected to result in an approximately uniform increase in latency across all the layers (since adding a new switch hop should affect all layers equally), and indeed this is what is seen with the GET communications and two of the PUT communications: an increase of about 0.6 µs is found for these metrics. But then for the application-level PUT communications, the change from SGSS and SGDS results in nearly double the expected additional latency (1.2 µs). This doubling does not occur at the other levels, and this indicates that it is likely that there is an issue specific to the application level. Moreover, the fact that the same issue is not seen for GET communications at the application level but is seen for PUT communications at the application level indicates that this issue is not occurring across the entire application level but is instead something specific to PUT communications at the application level (e.g., there may be an issue in how the application layer handles PUT communications).

In some examples, the system 100 is preconfigured to use certain metrics as the "expected" value in comparison to others. In other examples, the system 100 (or in some cases, a user) may determine on the fly which values should be used as the "expected" values. For example, certain measurements or metrics may be grouped together on the grounds that they are expected to be similar to one another (i.e., within a predetermined threshold of one another). Such groupings may be inferred from knowledge of the system, its network topology, the components used in the system, and any other relevant data. For example, two communications that are expected to travel a same distance in the network may be expected to have similar latencies, and thus latency measurements or metrics derived therefrom may grouped together. Then, and "expected" value that is used in comparison to each of the measurements/metrics in the group may be determined to be one of the values (or value range) in the group, such as the lowest value in the group or the value that is most common or consistent among the group of measurements/metrics (e.g., wherein values that are within a predetermined threshold of one another are considered as being the same for this purpose). t. In the example scenario above, for example, the SGSS-to-SGDS metrics constitute a group of metrics that are expected to have similar values, and the most consistent value for the SGSS-to-SGDS metrics was around 0.6 µs, and thus this could be determined to be the "expected" value used in comparison for all other SGSS-to-SGDS metrics. As another example, when two metrics are expected to be similar (e.g., less than a predetermined distance apart as measured by actual values, percentages, number of standard deviations, or the like) but are not, the one that is lower may be treated as the "expected" value for the both metrics (e.g., as it represents the lowest latency, which is generally preferred). For example, in the example scenarios, the SGSS-to-SGDS metrics for PUT communications at the application and library levels may be expected to be similar to one another, and thus the lower value—in this case, the SGSS-to-SGDS PUT metric for the library level—may be used as the "expected" value for the comparison. In other examples, a user may specify which values are to be used as the "expected" values in relation to others.

It should be noted that the metrics and comparisons described in relation to the example scenario above are not the only comparisons that could be made in that scenario, and that the same insights and/or additional insights could be reached by comparing other metrics. For example, in some examples, additional metrics may be derived and compared. For example, metrics indicative of the overhead attributable to the different network levels may be determined by the system. These metrics are shown in the last two lines of Table 1 above for the example scenario. As the network levels build upon one another, a measurement taken at each level is indicative of the latency not only at that level but also at the lower levels of the network. Thus, a measurement taken at the application level includes the latency for the application level in addition to the latency at the library and hardware levels, as shown in FIG. 1A. To achieve a latency measurement that is attributable only to a particular level of the network, the latency measurement for the next lowest level in the communication stack may be subtracted therefrom (as the next lowest level includes not only the latency attributable to that level but also all other lower levels of the network). Thus, the application level overhead for an SGSS communication route for a GET/read communication is 0.17 µs (i.e., 2.79 µs-2.62 µs), the application level overhead for an SGDS communication route for a GET read communication is 0.13 µs (i.e., 3.46 µs-3.33 µs), the application level overhead for an SGSS communication route for a PUT/write communication is 0.51 µs (i.e., 2.53 µs-2.02 µs), and the application level overhead for an SGDS communication route for a PUT/write communication is 1.1 µs (3.73 µs-2.63 µs). The library level overhead for an SGSS communication route for a GET/read communication is 1.02 µs (i.e., 2.62 µs-1.6 µs), the library level overhead for an SGDS communication route for a GET/read communication is 1.08 µs (i.e., 3.33 µs-2.25 µs), the library level overhead for an SGSS communication route for a PUT/write communication is 0.84 µs (i.e., 2.02 µs-1.18 µs), and the library level overhead for an SGDS communication route for a PUT/write communication is 0.85 µs (i.e., 2.63 µs-1.78 µs). The measured latency values for the hardware level also represent the hardware level overhead as the hardware level is the lowest level of the network communication stack.

These overhead metrics may also be compared. In the example scenario above, comparing the overhead metrics confirms the observation that the excess latency-causing portion of the network is likely the application level for PUT/write communications is supported, as the overhead at this level for SGDS communication routes and PUT/write communications (i.e., 1.1 µs) is significantly higher (i.e., nearly double which may be indicative of an unacceptable delay as all packets generally are expected to follow the same path and thus have nearly identical latencies) than the application-level overhead for SGSS (i.e., 0.51 µs). Significantly higher here means higher by an amount exceeding the thresholds mentioned above in relation to determining a discrepancy. More specifically, the application overhead is expected to be different between GET and PUT communications, as they have different handling requirements, but the application overhead is expected to be unchanging when switching between SGSS and SGDS communication routes, since the route that the communication traverses should not affect the application's overhead. Thus, the application overhead metric for an SGSS communication may be used as the "expected" value in comparison to the SGDS communications at the same level. When this is done for the GET communications, no discrepancy is detected (approximately the same overheads of 0.13 and 0.17 µs are found). On the other hand, for PUT communications, the application overhead for SGDS (1.1 µs) is much higher than the application overhead for SGSS (0.51 µs), and this discrepancy indicates there is something wrong with how SGDS communications are being handled. Moreover, because this discrepancy between the SGDS and SGSS overheads occurs only at the application level and only for PUT communications, this indicates that the issue may reside in how the application level handles PUT communications that traverse SGDS routes.

The example above was described in relation to a particular connection topology in which communications can have zero switch-hops (SGSS), 1 intra-group switch hop (SGDS), or 1 global (inter-group) switch hop. However, in other examples, the connections topologies may differ. For example, another system topology is a so-called "fat-tree" topology. In such a fat tree topology, communications may take 0, 2, 4, 6, or more switch hops, depending on the size of the system. In other examples, other connections topologies may be used. Regardless of the particular connection topology that is used, a similar type of analysis as that described above may be applied. For example, for any given connection topology, it can be determined which types of communications routes will be expected, including, for example, their relative distances, the number and/or type of switch hops involved, and other similar factors, and based on this understanding the latency changes between routes and/or the overhead attributable to each network level may be determined.

Thus, the above example illustrates one way in which performing an end-to-end network performance analysis may allow problem areas of the network to be identified by breaking down performance latency measurements based on different hardware and software components, comparing the latency measurements and/or metrics derived from the latency measurements to expected latency measurements/metrics, and based on the comparison, determining where higher than expected latencies are occurring.

Figure 2:
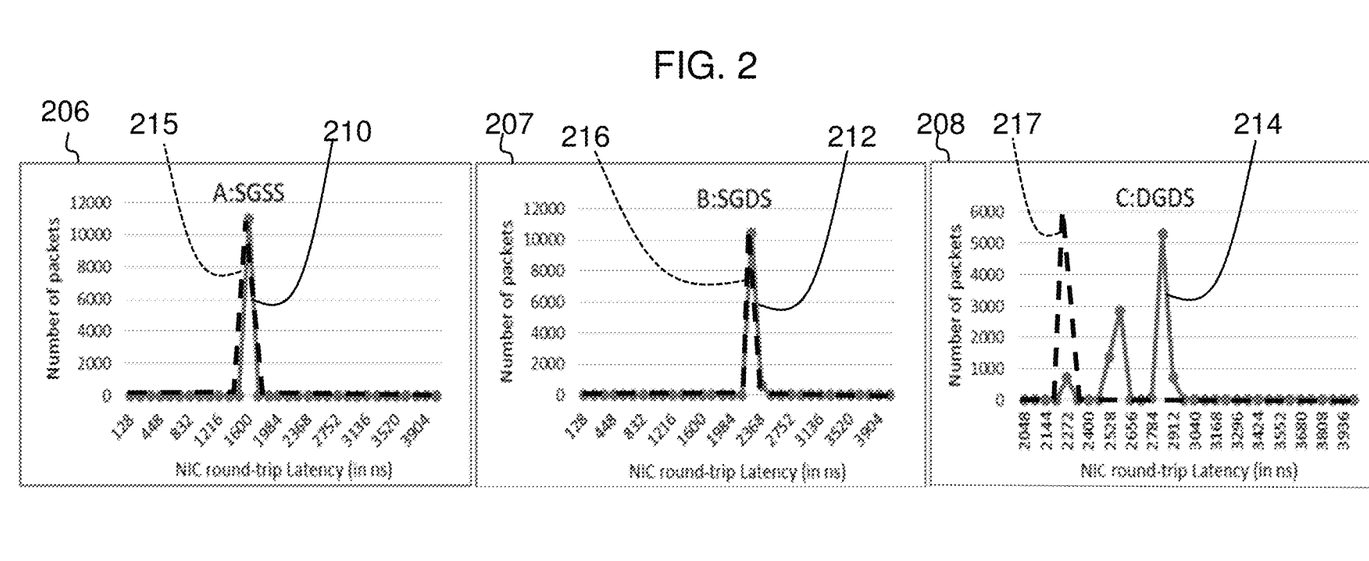
FIG. 2 is a schematic diagram showing example histograms that may be used for conducting network performance analysis in accordance with an example implementation of the present disclosure.

As another example, a statistical distribution of the latency measurements for a given network layer, communication route, and/or communication type may be determined, and this statistical distribution may be compared to an expected distribution to identify discrepancies. For example, in some implementations, the statistical distribution comprises a histogram formed from the determined latency measurements for a given network level, communication type, and communication route type (e.g., SGSS, SGDS, or DGDS), with the latencies being grouped into a plurality of bins. This is shown in FIG. 2 for the hardware level (i.e., NIC round trip latency) for GET/read communications, with values from a hypothetical scenario being used. Plot 206 shows histogram 210 for an SGSS communication route, plot 207 shows histogram 212 for an SGDS communication route, and plot 208 shows histogram 214 for a DGDS communication route.

The histogram of determined latency measurements may be compared to an expected histogram. The expected histogram may be an actual statistical representation (not shown) or may be an expectation based on what is known regarding the subject network. For instance, in the illustrated implementation, it may be known that packets are expected to have latencies in a certain range at the hardware level (e.g., at about 1600 nanoseconds) and that packets are expected to take the shortest possible communication route and, thus, it may be expected that measurements result in a histogram with a single peak (i.e., suggesting that the majority of the packets are following the same, shortest, route) appearing at the expected latency measurement. The expected latency may be known based on hardware specifications or may be derived from measurements. With the expected latency known and the number of peaks known, expected histograms can be created that have peaks at the expected values. Note that, for this analysis, the number and/or locations of peaks is what is compared, and thus the magnitude of the peaks in the expected histograms may be set arbitrarily. A peak may be any bin in the histogram that has a count that is greater than a threshold value, which may be a fixed value or a percentage value (e.g., 10% or more of the total observed counts), either of which may be configurable or predefined. FIG. 2 illustrates some example expected histograms 215, 216, and 217 in dashed lines for comparison to histograms 210, 212, and 214, respectively.

Based on the comparison, a discrepancy between the expected distribution and the determined distribution may be determined and, based on where the discrepancy is located (e.g., which network level, communication route, and/or communication type the discrepant distribution corresponds to), one of the network levels, communication routes, and/or communication types may be identified as problematic (i.e., an excess-latency-causing portion of the network). For example, in the scenario illustrated in FIG. 2, For histograms 210 and 212, the expected single peak behavior is shown to be occurring and thus these histograms 210 and 212 match their expected histograms 215 and 216 (in terms of the number and locations of peaks). However, for histogram 214 (DGDS communication route), there are three peaks as compared to the one peak in the expected histogram 217, and thus a discrepancy is detected. This discrepancy suggests that, for DGDS GET communications, the packets are taking different routes of different lengths. This is contrary to the expected behavior and suggests that the hardware may be improperly configured or otherwise experiencing a problem. Accordingly, the hardware layer may be identified as an excess-latency-causing portion of the network for DGDS communication routes. Accordingly, FIG. 2 illustrates another way in which performing a network performance analysis may allow problem areas of the network to be identified.

The example above was described in relation to a particular connection topology in which communications can have zero switch-hops (SGSS), 1 intra-group switch hop (SGDS), or 1 global (inter-group) switch hop, but in other examples the connections topologies may differ. For example, in a fat tree topology, communications may take 0, 2, 4, 6, or more switch hops, depending on the size of the system. In other examples, other connections topologies may be used. Regardless of the particular connection topology that is used, a similar type of analysis as that described above may be applied. For example, for any given connection topology, it can be determined which types of communications routes will be expected, including, for example, their relative distances, the number and/or type of switch hops involved, and other similar factors, and based on this understanding the number and/or locations of peaks in the histogram may be predicted.

Figure 3:
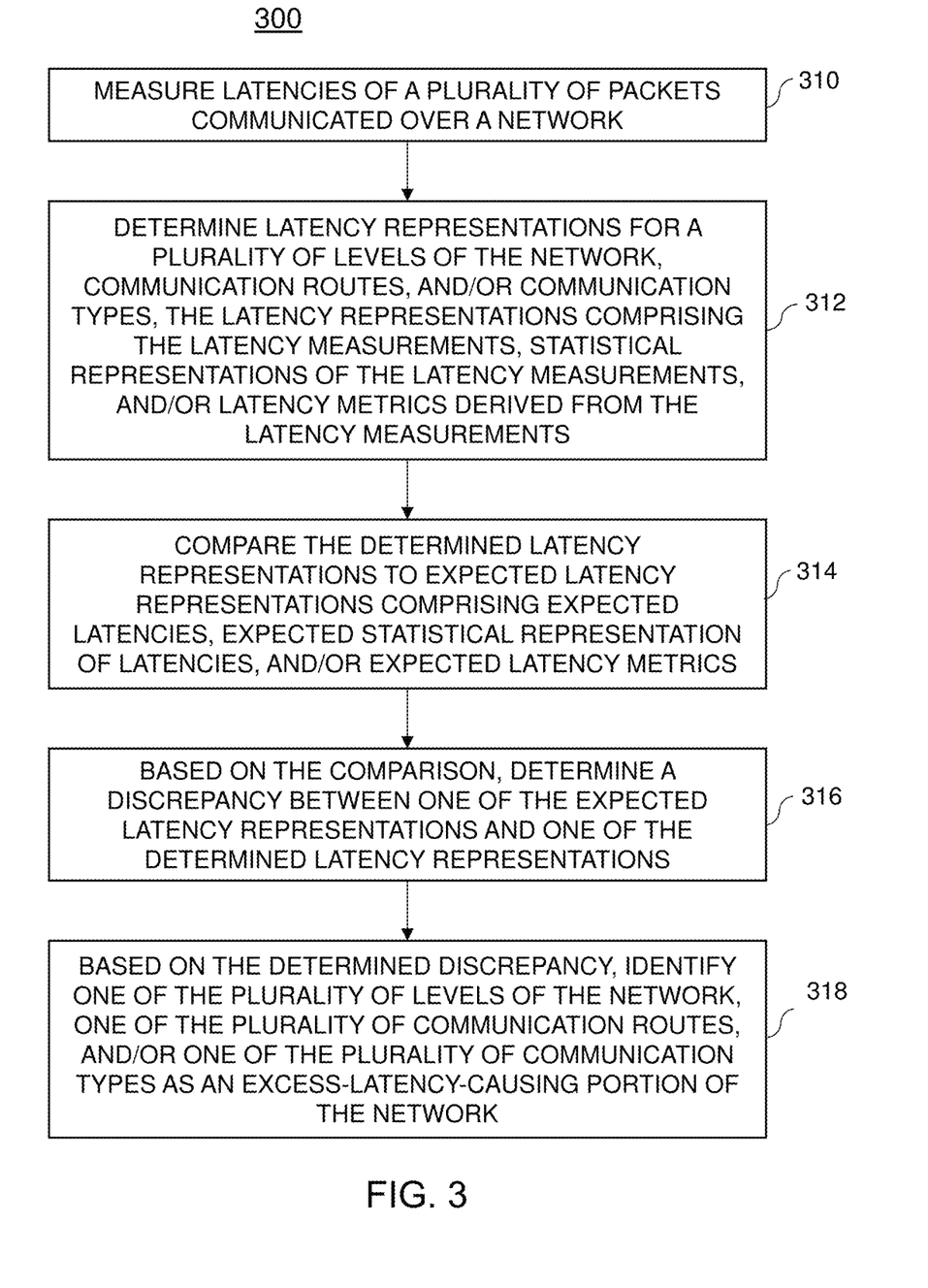
FIG. 3 is a flow diagram showing an illustrative method for conducting network performance analysis in accordance with an example implementation of the present disclosure.

FIG. 3 is a flow diagram depicting an example method 300 for conducting a network performance analysis in accordance with an implementation of the present disclosure. The method 300 may be performed, for example, by the computing system 100 of FIG. 1. At step 310, the latencies of a plurality of packets communicated over a network may be measured. By way of example only, packet latencies may be measured utilizing tools and/or utilities specific to an application, library, or hardware device of the computing system.

At step 312, latency representations for a plurality of levels of the network (e.g., an application level, a library level, and/or a hardware level), for a plurality of communication routes (e.g., SGSS, SGDS, and/or DGDS), and/or for a plurality of communication types (e.g., GET/read and/or PUT/write communications) may be determined. The latency representations may comprise the latency measurements themselves, statistical representations of the latency measurements (e.g., histograms), and/or latency metrics derived from the latency measurements (e.g., measurement differences resulting in latencies that are attributable to a particular network level, communication route, and/or communication type).

At step 314, the determined latency representations may be compared to expected latency representations. The expected latency representations may comprise expected latencies, expected statistical representation of latencies, and/or expected latency metrics. These expected latency representations may be predetermined, configurable, and/or dynamically determined. Based on the comparison, at step 316, a discrepancy between one of the expected latency representations and one of the determined latency representations may be determined.

At step 318, based on the determined discrepancy, one of the plurality of levels of the network, one of the plurality of communication routes, and/or one of the plurality of communication types may be determined as an excess-latency-causing portion of the network. In some implementations, remedial action may be taken to address and/or correct the discrepancy.

Figure 4:
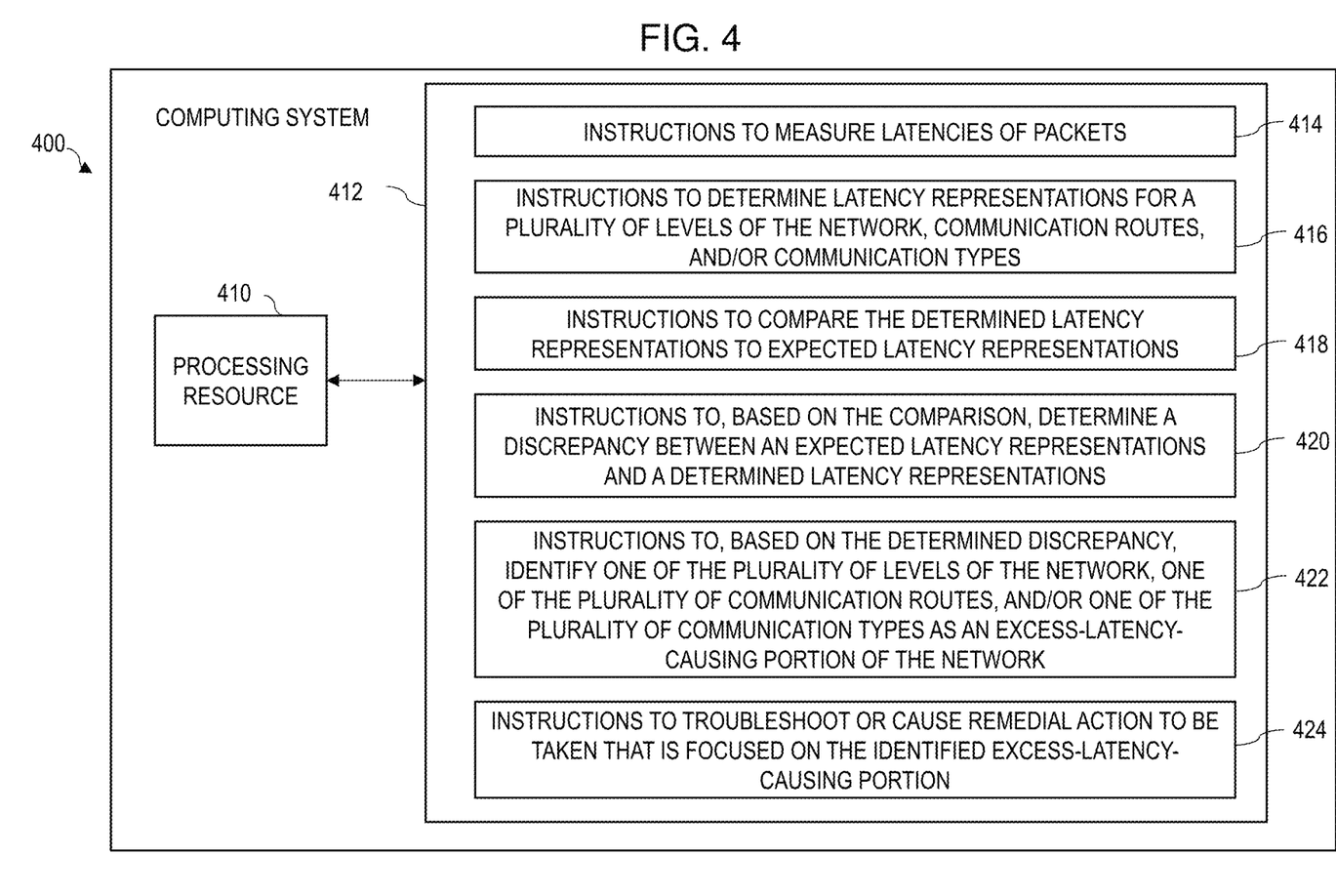
FIG. 4 is a block diagram showing an example computing system, in accordance with some implementations of the present disclosure.

FIG. 4 is a block diagram showing an example computing device 400, in accordance with some implementations of the present disclosure. In the example illustrated in FIG. 4, the computing device 400 includes a processing resource 410 coupled with a non-transitory, computer-readable storage medium 412 encoded with computer-executable instructions to perform a systems settings memory reset. The processing resource 410 may include a microcontroller, a microprocessor, central processing unit core(s), graphical processing unit core(s), an application-specific integrated circuit (ASIC), a field programmable gate array (FPGA), and/or another hardware device suitable for retrieval and/or execution of instructions from the computer-readable storage medium 412 to perform the functions related to various examples described herein. Additionally, or alternatively, the processing resource 410 may include electronic circuitry for performing the functionality of the instructions described herein.

The computer-readable storage medium 412 may be any medium suitable for storing executable instructions. Non-limiting examples of computer-readable storage medium 412 include RAM, ROM, EEPROM, flash memory, a hard disk drive, an optical disc, or the like. The computer-readable medium storage 412 may be disposed within the computing device 400, as shown in FIG. 4, in which case the executable instructions may be deemed "installed" or "embedded" on the computing device 400. Alternatively, the computer-readable storage medium 412 may be a portable (e.g., external) storage medium, and may be part of an "installation package." The instructions stored on the computer-readable storage medium 412 may be useful for implementing at least the methods described herein (e.g., the method shown in FIG. 3).

In the context of the present example, the computer-readable storage medium 412 is encoded with a set of executable instructions 414-424. It should be understood that part or all of the executable instructions and/or electronic circuits included within one block may, in alternate implementations, be included in a different block shown in the figures or in a different block not shown.

Instructions 414, upon execution, may cause the processing resource 410 to measure (or otherwise obtain) latencies of a plurality of packets communicated over a network. By way of example only, packet latencies may be measured/obtained utilizing tools and/or utilities specific to an application, library, or hardware device of the computing system.

Instructions 416, upon execution, may cause the processing resource 410 to determine latency representations for a plurality of levels of the network, for a plurality of communication routes, and/or for a plurality of communication types. The latency representations may comprise the latency measurements themselves, statistical representations of the latency measurements (e.g., histograms), and/or latency metrics derived from the latency measurements (e.g., measurement differences resulting in latencies that are attributable to a particular network level, communication route, and/or communication type).

Instructions 418, upon execution, may cause the processing resource 410 to compare the determined latency representations to expected latency representations. The expected latency representations may comprise expected latencies, expected statistical representation of latencies, and/or expected latency metrics.

Instructions 420, upon execution, may cause the processing resource 410 to, based on the comparison, determine a discrepancy between one of the expected latency representations and one of the determined latency representations.

Instructions 422, upon execution, may cause the processing resource 410 to, based on the determined discrepancy, identify one of the plurality of levels of the network, one of the plurality of communication routes, and/or one of the plurality of communication types as an excess-latency-causing portion of the network.

Instructions 424, upon execution, may cause the processing resource 410 to troubleshoot or cause remedial action to be taken that is focused on the identified excess-latency-causing portion. For instance, the processing resource 410 may cause a communication to be sent instructing a user to change one or more configuration settings for the identified excess-latency-causing portion of the network.

The processing described herein with reference to FIGS. 1 through 4 may be implemented in the form of executable instructions stored on a machine-readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computing systems or nodes of various forms, such as the system described above with reference to FIGS. 1A-1D.

The technology described herein includes various steps, examples of which have been described above. As described further above, these steps may be performed by hardware components or may be embodied in machine-executable instructions, which may be used to cause a processor programmed with the instructions to perform the steps. Alternatively, at least some steps may be performed by a combination of hardware, software, and/or firmware.

The technology described herein may be provided as a computer program product, which may include a tangible machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), magnetooptical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

In the technical description herein, numerous specific details are set forth in order to provide a thorough understanding of example implementations. It will be apparent, however, to one skilled in the art that implementations described herein may be practiced without some of these specific details. In other instances, well-known structures and devices are shown in block diagram form.

The terminology used herein is for the purpose of describing example implementations only and is not intended to be limiting. As used herein, the singular forms "a," "an," and "the" are intended to include the plural forms as well, unless the context clearly indicates otherwise. The term "plurality," as used herein, is defined as two, or more than two. The term "and/or" as used herein refers to and encompasses any and all possible combinations of one or more of the associated listed items. As used herein, the term "includes" means includes but not limited to, and the term "including" means including but not limited to. The term "based on" means based at least in part on. If the specification states a component or feature "may," "can," "could," or "might" be included or have a characteristic, that particular component or feature is not required to be included or have the characteristic. As used in the description herein, the meaning of "in" includes "in" and "on" unless the context clearly dictates otherwise.

Various methods described herein may be practiced by combining one or more machine-readable storage media containing the code according to example embodiments described herein with appropriate standard computer hardware to execute the code contained therein. An apparatus for practicing various embodiments described herein may involve one or more computing elements or computers (or one or more processors within a single computer) and storage systems containing or having network access to computer program(s) coded in accordance with various methods described herein, and the method steps of various embodiments described herein may be accomplished by modules, routines, subroutines, or subparts of a computer program product.

In the foregoing description, numerous details are set forth to provide an understanding of the subject matter disclosed herein. However, implementations may be practiced without some or all of these details. Other implementations may include modifications and variations from the details discussed above. It is intended that the following claims cover such modifications and variations.

What is claimed is:

1. A method of conducting a network performance analysis on a computing system comprising a plurality of nodes networked together via a plurality of switches, the method comprising:
   measuring, by one of the nodes of the computing system, latencies of a plurality of packets communicated by the node over a network, wherein the plurality of nodes and switches are divided into multiple groups, with each group comprising one or more nodes and one or more switches;
   determining latency representations for a plurality of levels of the network and three different types of communication routes, wherein the latency representations comprise the latency measurements, statistical representations of the latency measurements, and latency metrics derived from the latency measurements, wherein the plurality of levels of the network comprise an application level, a library level, and a hardware level, wherein the three different types of communication routes comprise a first type of communication routes between two nodes in a same group and coupled to a same switch, a second type of communication routes between two nodes in a same group and coupled to different switches, and a third type of communication routes between two nodes in different groups and coupled to different switches, and wherein determining the latency metrics comprises determining a first average latency for the first type of communication routes and a second average latency for the second type of communication routes;
   comparing the determined latency representations to expected latency representations, the expected latency representations comprising expected latencies, expected statistical representation of latencies, and/or expected latency metrics;
   based on the comparing, determining a discrepancy between one of the expected latency representations and one of the determined latency representations; and
   based on the determined discrepancy, identifying one of the plurality of communication routes as an excess-latency-causing portion of the network.

2. The method of claim 1, wherein determining the latency metrics further comprises determining a difference between the first average latency and the second average latency and determining a latency attributable to a particular level of the plurality of levels of the network.

3. The method of claim 1, wherein the latency representations comprise statistical distributions of latency values.

4. The method of claim 3, wherein the statistical distributions of latency values comprise histograms.

5. The method of claim 3, wherein the statistical distributions correspond to respective types of communication routes.

6. The method of claim 1, further comprising: troubleshooting or causing remedial action to be taken that is focused on the identified excess-latency-causing portion of the network.

7. A non-transitory computer-readable storage medium having stored thereon, a set of computer-executable instructions for causing one or more processors to:
   obtain, from a node of a computing system comprising a plurality of nodes networked together via a plurality of switches, latency measurements of a plurality of packets communicated by the node over a network, wherein the plurality of nodes and switches are divided into multiple groups, with each group comprising one or more nodes and one or more switches;
   determine latency representations for a plurality of levels of the network and three different types of communication routes, wherein the latency representations comprise the latency measurements, statistical representations of the latency measurements, and latency metrics derived from the latency measurements, wherein the plurality of levels of the network comprise an application level, a library level, and a hardware level, wherein the three different types of communication routes comprise a first type of communication routes between two nodes in a same group and coupled to a same switch, a second type of communication routes between two nodes in a same group and coupled to different switches, and a third type of communication routes between two nodes in different groups and coupled to different switches, and wherein determining the latency metrics comprises determining a first average latency for the first type of communication routes and a second average latency for the second type of communication routes;

compare the determined latency representations to expected latency representations, the expected latency representations comprising expected latencies, statistical representation of latencies, and/or expected latency metrics;

based on the comparison, determine a discrepancy between one of the expected latency representations and one of the determined latency representations; and based on the determined discrepancy, identify one of the plurality of communication routes as an excess-latency-causing portion of the network.

8. The computer-readable storage medium of claim 7, wherein determining the latency metrics further comprises determining a difference between the first average latency and the second average latency and determining a latency attributable to a particular level of the plurality of levels of the network.

9. The computer-readable storage medium of claim 7, wherein the latency representations comprise statistical distributions of latency values, and wherein the statistical distributions of latency values comprise histograms.

10. The computer-readable storage medium of claim 9, wherein the statistical distributions correspond to respective types of communication routes.

11. The computer-readable storage medium of claim 10, wherein the set of computer-executable instructions further cause the one or more processors to:

troubleshoot or cause remedial action to be taken that is focused on the identified excess-latency-causing portion of the network.

12. A system for conducting a network performance analysis of a computing system comprising a plurality of nodes networked together via a plurality of switches, the system comprising:

one or more processors configured to:
obtain latency measurements from one of the nodes of the computing system of a plurality of packets communicated by the node over a network, wherein the plurality of nodes and switches are divided into multiple groups, with each group comprising one or more nodes and one or more switches;

determine latency representation for a plurality of levels of the network and three different types of communication routes, wherein the latency representations comprise the latency measurements, statistical representations of the latency measurements, and latency metrics derived from the latency measurements, wherein the plurality of levels of the network comprise an application level, a library level, and a hardware level, wherein the three different types of communication routes comprise a first type of communication routes between two nodes in a same group and coupled to a same switch, a second type of communication routes between two nodes in a same group and coupled to different switches, and a third type of communication routes between two nodes in different groups and coupled to different switches, and wherein determining the latency metrics comprises determining a first average latency for the first type of communication routes and a second average latency for the second type of communication routes;

compare the determined latency representations to expected latency representations, the expected latency representations comprising expected latencies, statistical representation of latencies, and/or expected latency metrics;

based on the comparison, determine a discrepancy between one of the expected latency representations and one of the determined latency representations; and based on the determined discrepancy, identify one of the plurality of communication routes as an excess-latency-causing portion of the network.

13. The system of claim 12, wherein determining the latency metrics further comprises determining a difference between the first average latency and the second latency and determining a latency attributable to a particular level of the plurality of levels of the network.

14. The system of claim 12, wherein the latency representations comprise statistical distributions of latency values, and wherein the statistical distributions of latency values comprise histograms.

15. The system of claim 14, wherein the statistical distributions correspond to respective types of communication routes.

* * * * *